UNITED STATES PATENT OFFICE.

PAUL HERMANN MINCK, OF PETERSDORF, GERMANY, ASSIGNOR, BY MESNE ASSIGNMENTS, TO THE CHEMICAL FOUNDATION, INC., A CORPORATION OF DELAWARE.

PROCESS OF PREPARING A PERMANENT AND SPINNABLE SOLUTION IN THE CUPRIC-AMMONIA PROCESS.

1,421,707.  Specification of Letters Patent.  Patented July 4, 1922.

No Drawing.  Application filed July 23, 1918. Serial No. 246,419.

*To all whom it may concern:*

Be it known that I, PAUL HERMANN MINCK, a citizen of the free town of Hamburg, residing at the village of Petersdorf, in the Kingdom of Prussia, Germany, have invented certain new and useful Improvements in a Process of Preparing a Permanent and Spinnable Solution in the Cupric-Ammonia Process, of which the following is a specification.

In preparing cellulose solutions by the cupric ammonia process it was heretofore necessary to maintain a temperature of 4° cent. The finished solution had, furthermore to be kept at such temperature until it was spun.

Later it was proposed to employ sugar in preparing permanent cellulose solutions at a normal temperature. It has been disclosed, to embody carbohydrates in cupric ammonia cellulose solutions and to treat such solutions with tetrahydric or higher alcohols such as dulcitol or manitol; a modification has also been disclosed consisting in the organic substances of the cellulose or cupric ammonia mixture being mixed with each other before further treatment.

The processes quoted show a degree of uncertainty regarding the selection of the organic admixtures and their proper use in preparing cellulose solutions, and in fact such uncertainty did exist up to a short time ago, and it has been only by the experiences gained in course of many years that the full explanation of the complicated reactions occurring in the solution of cellulose by means of cupric ammonia has been found.

It was found that for the practical application of the process on a commercial scale certain kinds of sugar were preferable, as these could be obtained of the necessary purity, so as to ensure their rapid combination within the matter to be spun and to prevent a coloration of the cellulose, both points on which the spinning capacity and the appearance of the finished product depends.

It has been claimed that the spinning materials are more permanent and that the threads obtained therefrom have a greater strength and elasticity beside a very fine silky gloss. These claims are however only fulfilled, if in preparing the solution the respective sugars are correctly selected with regard to their characteristic or specific effect and if they are employed in given, accurately determined quantities.

The use of glucose is known and the quantity used has been 35% of the weight of the cellulose. A solution, however, prepared by such means, does not show any improvement as compared with spinning materials prepared without sugar; possibly a greater strength might be shown but such increase in strength would be accompanied by serious disadvantages. An addition of 35% of glucose is by far too great and will result in such quantities of slimy substances in the solution, that the filter cells, through which the material must pass, will soon be filled and choked; furthermore the fine orifices of the spinning nozzles would soon be stopped for the same reason. It has therefore been found that it is impossible to spin such materials on a commercial basis. Besides the spun product will have a deep yellow color owing to the impurities contained in the glucose, and such color can not be removed. The gloss of the spun threads is also seriously impaired by the slimy matter drying on their surface. The strength of the threads suffers due to the presence of the molecules of the glucose, since this serves to prevent cohesion of the cellulose molecules. The sugar should not form a physical part of the finished threads, but should enter into chemical combination with the hydrate of cellulose. It is therefore quite wrong to employ sugar in large quantities, as it then will only act as a detrimental ballast in the spinning solutions.

It has now become apparent that the sugar has only chemical duties, and these in entirely different senses, which form the feature of the present invention.

The first duty or effect of the sugar consists in reducing the cupric salt and the cellulose, both of which show during the process of manufacture of the spinning solution a great tendency to oxidize. If such oxidation is prevented the solubility of the cupric oxide in ammonia is considerably greater, the solution of the cellulose more rapid and complete, and the spinning solution obtained more permanent.

For securing this effect such kinds of sugar are best suited which will have a strong reducing effect in small quantities and at a normal temperature.

The sugars belonging to this class are of the group of grape sugars, such as glucose and the saccharides which all correspond to the formula $C_6H_{12}O_6$. Amongst these glucose and invert sugar an equimolecular mixture of glucose and fructose are the best suited.

Of these latter kinds of sugar ¼% (a quarter per cent) of the weight of the cellulose will be sufficient to ensure a strong and effective action against the oxidizing tendency of the cupric salt and the cellulose during the preparation of the spinning solution. Spinning solutions prepared in such manner will stand comparatively high temperature and are very permanent, if kept in closed vessels.

Difficulties have, however, been encountered in spinning such solutions and in the quality of the woven material made therefrom. The reduction of the cupric salt and the cellulose by means of the glucose is accompanied by a dehydration which impairs the homogenity of the spinning material and its spinning capacity, which demands a perfect homogeneity. When emerging from the orifice of the nozzles the fine threads will not possess the necessary ductility and will therefore readily break in the coagulation bath; the finished thread is besides hard and possesses little elasticity. This may be explained by the fact that the original cellulose cannot, in consequence of the dehydrating effect of the sugar absorb in its dissolved state sufficient chemically bound water, so as to be precipitated when the solution is spun in the spinning bath as a full hydrate of cellulose, in which form only the spun material will receive its favorable qualities as regards strength, elasticity and gloss.

For obviating such difficulties other sugars are employed, which, contrary to glucose and invert sugar have a decided hydrating effect on cellulose and cupric salts, whilst at the same time they prevent an oxidation thereof. These sugars belong to the group of cane sugars, the disaccharides, and of these refined beet sugar has been found to be the one most preferable. The disaccharides thus perform a special duty in forming cellulose solutions, which is directly contrary to that of grape sugar. A permanent solution of cellulose treated with very small quantities of glucose will become spinnable only after, by the addition of disaccharides the hydration of the cellulose has been secured. It appears as if this effect is obtained by catalysis, as about 2% of the weight of the cellulose will, on the average, suffice to convert the latter into the desired hydrate. The condition of the cellulose may also determine the amount of disaccharide to be used. Cellulose which has been little or not at all decomposed will require only a small amount of disaccharide.

As the formula for cane sugar and cellulose hydrate is the same, viz. $C_{12}H_{22}O_{11}$, this mutual effect of the substances employed may be theoretically explained.

In the new process the volume of sugar employed (a total of approximately 2¼%) is so small that the spinning solution can by no means be spoiled by the same.

According to the facts ascertained it is impracticable to substitute cane sugar for the grape sugar. Theoretically it is possible to substitute cane sugar for the grape sugar, but this is not practicable because the reducing effect of cane sugar will start at higher temperatures only, and will even then amount to only 1/10th of the reducing power of grape sugar. If the reduction of the cupric salt and the cellulose necessary for the permanence of the spinning material were to be secured by cane sugar, such large quantities of the latter would have to be used that the spinning capacity of the masses would be rendered doubtful by the considerable quantities of unoxidized slimy matter resulting from the sugar. The claims hereinafter specified are based upon the accurate recognition of the different effects of the two kinds of sugar described in the foregoing statement. By working according to the specifications heretofore disclosed it was not possible to obtain a permanent and spinnable cellulose solution by means of sugar.

I claim:

1. The process of preparing spinnable cupric-ammonia-cellulose solutions consisting in the reduction of the cupric salts present in the solution and dehydration of the cellulose by means of sugars of the grape sugar group and the hydration of the cellulose by sugars of the cane sugar group, the amount of such sugars being not less than one-quarter of one per cent and not more than two and one-half per cent based on the weight of cellulose employed.

2. The process of preparing spinnable cupric-ammonia-cellulose solutions consisting in the reduction of the cupric salts present in the solution and dehydration of the cellulose by means of glucose and the hydration of the cellulose by sugars of the cane sugar group, the amount of such sugars being not less than one-quarter of one per cent and not more than two and one-half per cent based on the weight of cellulose employed.

3. The process of preparing spinnable cupric-ammonia-cellulose solutions consisting in the reduction of the cupric salts present in the solution and dehydration of the cellulose by means of sugars of the grape sugar group and the hydration of the cellulose by sucrose, the amount of such sugars being not less than one-quarter of one per cent and not more than two and one-half per cent based on the weight of cellulose employed.

4. The process of preparing spinnable cupric-ammonia-cellulose solutions consisting in the reduction of the cupric salts present in the solution and dehydration of the cellulose by means of glucose and the hydration of the cellulose by sucrose, the amount of such sugars being not less than one-quarter of one per cent and not more than two and one-half per cent based on the weight of cellulose employed.

5. The process of preparing spinnable cupric-ammonia-cellulose solutions consisting in the reduction of the cupric salts present in the solution and dehydration of the cellulose by means of glucose employing about one quarter of one per cent of the weight of cellulose and the hydration of the cellulose by sucrose employing about two per cent of the weight of cellulose.

6. A cupric-ammonia-cellulose solution containing about one quarter of one per cent—based on the weight of the cellulose—of glucose and about two per cent of sucrose.

In testimony whereof I have affixed my signature.

PAUL HERMANN MINCK.